UNITED STATES PATENT OFFICE.

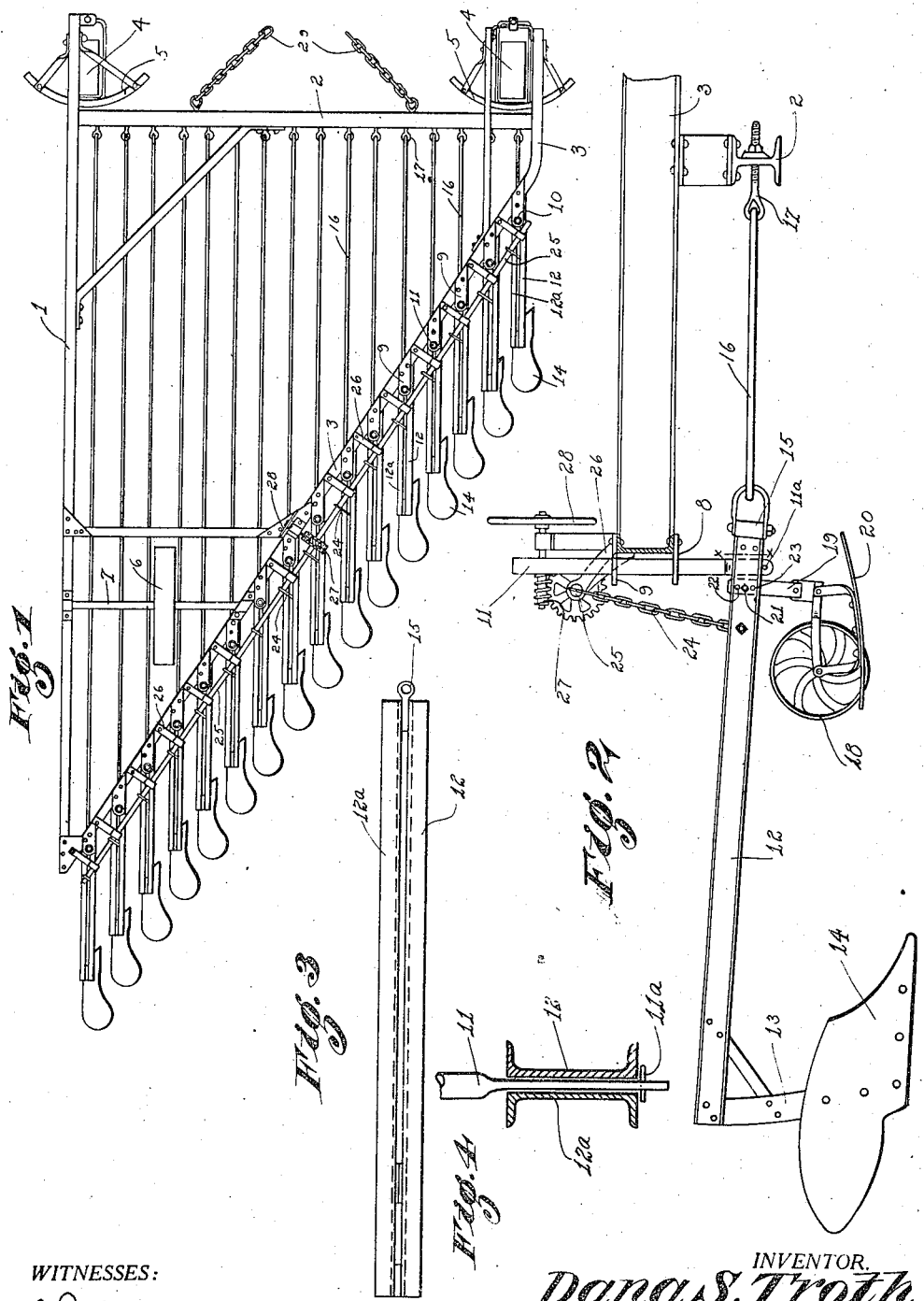

DANA S. TROTH, OF STOCKTON, CALIFORNIA.

GANG-PLOW FRAME.

1,157,067.  Specification of Letters Patent.  Patented Oct. 19, 1915.

Application filed November 14, 1914. Serial No. 872,130.

*To all whom it may concern:*

Be it known that I, DANA S. TROTH, a citizen of the United States, residing at Stockton, in the county of San Joaquin, State of California, have invented certain new and useful Improvements in Gang-Plow Frames; and I do declare the following to be a full, clear, and exact description of the same, such as will enable others skilled in the art to which it appertains to make and use the same, reference being had to the accompanying drawings, and to the characters of reference marked thereon, which form a part of this application.

The object of this invention is to provide particularly a means of construction whereby when using a gang-plow, each individual plow share will be allowed to follow the exact contour of the ground regardless of the adjacent plow shares. In using an engine drawn gang plow the strip of ground being plowed is quite wide, and where the surface of the ground is uneven my improved plow is particularly adapted to be used. Under the ordinary construction each plow is fastened rigidly or positively to the main frame so that if there is a low place in the ground toward the middle of the plow frame the plows will work only on the ends of the frame and be held clear of the ground in the center.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a top plan view of the complete plow. Fig. 2 is a side view, partly in section, of a single plow. Fig. 3 is a top view of the plow beam. Fig. 4 is a view partly in section on a line X—X of Fig. 2.

Referring now more particularly to the characters of reference on the drawings, the numeral 1 indicates a longitudinal frame member, the numeral 2 a transverse member, and the numeral 3 a diagonal member.

At each of the front corners of the frame, formed by the above mentioned members, I have provided a wheel 4 supported in a turntable frame 5 supplied with suitable rollers and guides to allow the necessary movement required in turning the plow. Near the rear and within the frame I have provided a large wheel 6 supported by a shaft 7 suitably journaled upon the adjacent frame members. The complete weight of the frame is carried by these three wheels 4—4 and 6.

To the diagonal member 3 I have fastened for each plow the brackets 8 and 9 having a large hole 10 therein in which loosely fits an upright annular guide post 11 slidable horizontally on its lower end between the adjacent members 12 and 12ª which form the plow beam. This guide 11 is free to move up or down in the brackets 8 and 9 and serves only to guide the front end of the plow beam straight ahead. It does not pull the plow beam nor hold it down. The rod 16 does all the pulling. A cotter pin 11ª is provided to keep the guide in engagement with the beam. On the outer end of the plow beam is mounted upon a brace 13 a plow share 14 of any desired construction. To the forward end of the plow beam is fastened a clevis 15 hooked into which is a rod 16 running forward to an eye bolt 17 provided in the transverse beam 2 of the plow frame. Threads are provided on this eye bolt to allow for any necessary take-up that may be required in the adjustment of the plow share.

Near the forward end of the plow beam 12—12ª is provided a gage wheel 18 carried by a support 19 having a guard 20 appended thereto to overcome any tendency of the wheel to sink into any soft ground that might be encountered.

To provide an adjustment for the gage wheel I have placed a number of holes 22 and 23 in the plow beam and the gage wheel frame may be fastened thereto by means of a bolt as at 21.

When the plow is not in use and it is necessary to move the same, the plows may be lifted out of working position by means of a chain 24 fastened to a shaft 25, supported by brackets 26. This shaft is rotated by a worm and gear 27 operated by a handwheel 28 suitably connected thereto.

Chains 29 are provided for connection to the motive power to be used.

From the foregoing description it will be seen that the plow-beams are allowed an independent vertical movement and are each provided with an individual draw rod connecting to a common draw bar forming a part of the plow frame. It will further be readily seen that I have provided such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention what I claim as new and useful and desire to secure by Letters Patent is:—

A device of the character described comprising the combination with a main frame having a draft means, of a plurality of independent plow frames, each having an independent draft connection with said first named frame, each plow frame comprising a pair of members spaced apart forming an intermediate slot, a guide member slidably mounted through the slot in each plow frame, said guide members being guided vertically adjacent said first named frame, as described.

In testimony whereof I affix my signature in presence of two witnesses.

DANA S. TROTH.

Witnesses:
STEPHEN N. BLEWETT,
FLOYD M. BLANCHARD.